United States Patent [19]
Leary et al.

[11] Patent Number: 5,935,545
[45] Date of Patent: Aug. 10, 1999

[54] PROCESS FOR PRODUCING AN AQUEOUS SOLUTION COMPRISING FERRIC CHLORIDE

[75] Inventors: Kevin J. Leary, Middletown; Juergen Kurt Plischke, Bear; John Larson Owen, Newark; John Robert Stecher, Wilmington, all of Del.

[73] Assignee: E. I. du Pont de Nemours and Company, Wilmington, Del.

[21] Appl. No.: 08/893,437

[22] Filed: Jul. 11, 1997

[51] Int. Cl.⁶ ...................................................... C01G 9/02
[52] U.S. Cl. .......................... 423/493; 423/150.3; 423/79
[58] Field of Search .......................... 423/79, 493, 150.3

[56] References Cited

U.S. PATENT DOCUMENTS

| | | | |
|---|---|---|---|
| 2,928,724 | 3/1960 | Mason et al. ............................. | 423/79 |
| 3,050,362 | 8/1962 | Oppegaard et al. ....................... | 423/79 |
| 3,261,664 | 7/1966 | Cairns et al. ............................ | 423/149 |
| 3,906,077 | 9/1975 | Rado et al. .............................. | 423/149 |
| 4,066,424 | 1/1978 | Kilgren et al. .......................... | 423/493 |
| 5,248,497 | 9/1993 | Hartmann et al. ....................... | 423/141 |
| 5,422,091 | 6/1995 | Clair et al. .............................. | 423/493 |
| 5,455,017 | 10/1995 | Clair et al. ............................. | 423/493 |
| 5,527,515 | 6/1996 | Clair et al. ............................. | 422/234 |

Primary Examiner—Ngoc-Yen Nguyen

[57] ABSTRACT

The present invention provides a process for preparing an aqueous solution of $FeCl_3$. The process involves the steps of: (a) reacting an ore material comprising titanium and iron with chlorine and coke to form a metal chloride vapor stream comprising titanium tetrachloride, ferrous chloride, ferric chloride and unreacted coke and ore solids; (b) cooling the metal chloride vapor stream to a temperature in the range of 350 to 500° C. to condense at least some of the ferrous chloride; (c) separating the condensed ferrous chloride and the unreacted coke and ore solids from the metal chloride vapor stream; (d) cooling the metal chloride vapor stream to a temperature in the range of 180 to 240° C. to form a precipitate comprising ferric chloride; and (e) adding the precipitate to water to form an aqueous solution comprising ferric chloride. The resulting aqueous solution has a high $FeCl_3$ content, and can be used in wastewater treatment applications.

11 Claims, 1 Drawing Sheet

PROCESS FOR PRODUCING AN AQUEOUS SOLUTION COMPRISING FERRIC CHLORIDE

BACKGROUND OF THE INVENTION

1. Field of the Invention

The present invention relates to a process for preparing an aqueous solution comprising ferric chloride. The ferric chloride is produced from the chlorination of titanium-bearing materials.

2. Description of the Related Art

Large amounts of metal chlorides arise as by-products from various industrial processes. For example, in a chloride process for making titanium dioxide ($TiO_2$) pigment, titanium-bearing material or ore is chlorinated to produce titanium tetrachloride ($TiCl_4$) and other metal chloride by-products. The metal chloride by-products are highly acidic and often contain iron chlorides as a major ingredient. Many processes to treat these materials are expensive and produce a product that must be disposed of by neutralization, landfilling, deepwelling, or other disposal methods.

The need therefore exists for a process for treating aqueous media containing metal chlorides that provides non-hazardous products that can be used in commercial applications.

It is known that iron chloride can be used as a flocculant for treatment of waste water. Conventionally high purity iron chloride solutions have been utilized for this purpose. Tedious and expensive processes have been developed to purify metal chloride by-product streams to render them suitable for use to treat wastewater.

Cairns and Kleinfelder, U.S. Pat. No. 3,261,664 describe a process to remove ferrous chloride ($FeCl_2$) from hot gases containing ferric chloride ($FeCl_3$), $TiCl_4$, and blowover solids comprising unreacted ores and carbon-containing material from a reaction for the chlorination of titanium-bearing materials which involves the following steps: (a) passing a stream containing $FeCl_2$, $FeCl_3$ and $TiCl_4$ into a flue at 900° C.; (b) injecting cool $TiCl_4$ into the flue to cool the stream to 500–550° C. which condenses $FeCl_2$ as a solid; (c) passing the mixture containing solid $FeCl_2$ and remaining gases to a dust or cyclone-type separator to separate solid $FeCl_2$ and blowover solids from the gases; (d) passing the gases to cooling towers, wherein $FeCl_3$ is removed by conventional means, e. g., by cooling the gases to 250–270° C. by a shower of an inert cooling medium such as cool $TiCl_4$, to form solid $FeCl_3$; (e) passing the mixture containing gases and solid $FeCl_3$ to a cyclone separator to remove solid $FeCl_3$; (f) condensing the remaining gases which are now free of solid chlorides; and (g) recovering liquid $TiCl_4$.

Rado and Nelson, U.S. Pat. No. 3,906,077 disclose a process for recovering substantially pure $FeCl_3$ from chlorinating an iron-containing ore which includes separation of a major portion of non-volatile solids in a first cyclone, followed by a cooling step (addition of liquid $TiCl_4$), to precipitate $FeCl_3$, use of a second cyclone to separate $FeCl_3$ and all other remaining non-volatile solids, and purification of $FeCl_3$ by recovery as overhead from a treatment zone at 350–700° C.

Hartmann and Schmeir, U.S. Pat. No. 5,248,497 disclose a process for the recovery of ferrous chloride from the gaseous effluent resulting from chlorination of titanium-containing material which involves: (a) separating $FeCl_2$ and blowover solids (unreacted coke, ore) and other metal chlorides in a cyclone to form cyclone dust; (b) slurrying the cyclone dust with a liquid (water, HCl); (c) removing the water-insoluble constituents of the slurry e.g., by filtration; (d) evaporating the solution under vacuum; (e) cooling the evaporated solution to allow $FeCl_2$ to crystallize; and (f) separating the $FeCl_2$ crystals. This patent does not describe a process for separating $FeCl_3$ or a process to provide a solution of $FeCl_3$ having low solids content.

Heretofore, a process where titanium-containing material is chlorinated to produce a metal chloride vapor stream which is cooled to a temperature greater than 500° C. to condense out a fraction of the $FeCl_2$ and other metal chlorides having high boiling points such as lead chloride ($PbCl_2$), manganese chloride ($MnCl_2$), magnesium chloride ($MgCl_2$), and chromium chloride ($CrCl_3$) in a cyclone separator has been commercially practiced. The precipitated solids as well as most of the entrained coke, ore, and gangue solids are collected in the cyclone underflow, thus purifying the $FeCl_3$ vapor stream which exits in the cyclone overflow.

In this commercial process, the cyclone overflow is further cooled to 180–240° C., wherein $FeCl_3$ is precipitated and then slurried with water to form an aqueous solution of $FeCl_3$ containing dissolved $FeCl_2$ and other miscellaneous metal chlorides, and trace amounts of water-insoluble coke, ore, and gangue solids. The $FeCl_3$ solution is further processed through a screening/settling process to reduce solids concentration to provide a product suitable for wastewater treatment applications.

Although the above-described process is effective in producing an aqueous solution of $FeCl_3$, it would be desirable to have an improved process which removes a larger fraction of the chlorides having high boiling point temperatures from the $FeCl_3$ stream. Also, when the above-described process is operated, solids build up on downstream piping and equipment causing restrictions and pluggage. Thus, it would be desirable to have a process which could be run more continuously with fewer downstream restrictions and pluggage.

The present invention provides an improved process which can be operated more continuously with fewer pluggage and restriction problems. The resulting aqueous solution has a high iron content, particularly a high $FeCl_3$ content, while having a low chromium chloride content, which is advantageous in wastewater treatment applications.

SUMMARY OF THE INVENTION

The present invention provides a process for preparing an aqueous $FeCl_3$ solution, comprising the steps of: (a) reacting an ore material comprising titanium and iron with chlorine and coke to form a metal chloride vapor stream comprising titanium tetrachloride, ferrous chloride, ferric chloride and unreacted coke and ore solids; (b) cooling the metal chloride vapor stream to a temperature in the range of 350 to 500° C. to condense at least some of the ferrous chloride; (c) separating the condensed ferrous chloride and the unreacted coke and ore solids from the metal chloride vapor stream; (d) cooling the metal chloride vapor stream to a temperature in the range of 180 to 240° C. to form a precipitate comprising ferric chloride; and (e) adding the precipitate to water to form an aqueous solution comprising ferric chloride.

In addition to ferrous chloride, other metal chlorides having a boiling point higher than the cooling temperature are condensed in the above-described step (b) and removed from the metal chloride stream in the above-described step (c). Examples of such metal chlorides include chromium chloride, manganese chloride, magnesium chloride, lead chloride, and mixtures thereof The metal chloride stream is preferably cooled in step (b) by injection of liquid titanium tetrachloride and the condensed solids are preferably removed in step (c) using a cyclone. The ferrous chloride and other metal chlorides can be removed from the cyclone through any suitable conveying device, preferably a rotary valve. Typically, the ferrous chloride and other metal chlorides are separated and removed from the metal chloride vapor stream in step (c) and conveyed to a quenching tank containing water.

Typically, the precipitate comprising the ferric chloride formed in the above-described step (d) is conveyed to a quenching tank containing water. The metal chloride stream is preferably cooled by addition of liquid titanium tetrachloride in step (d).

Typically, the aqueous ferric chloride solution formed by the process of this invention comprises some ferrous chloride. Chlorine may be injected into the solution to convert at least some of the ferrous chloride to ferric chloride. Preferably, the aqueous solution comprises 1–45%, more preferably 30–45%, by weight of ferric chloride, less than 0.5% by weight of ferrous chloride, less than 1% by weight of hydrochloric acid, and less than 0.5% by weight of solids based on total weight of the solution. Additional processing to remove at least some of the solids can also be performed.

DETAILED DESCRIPTION OF THE INVENTION

Figure 1:
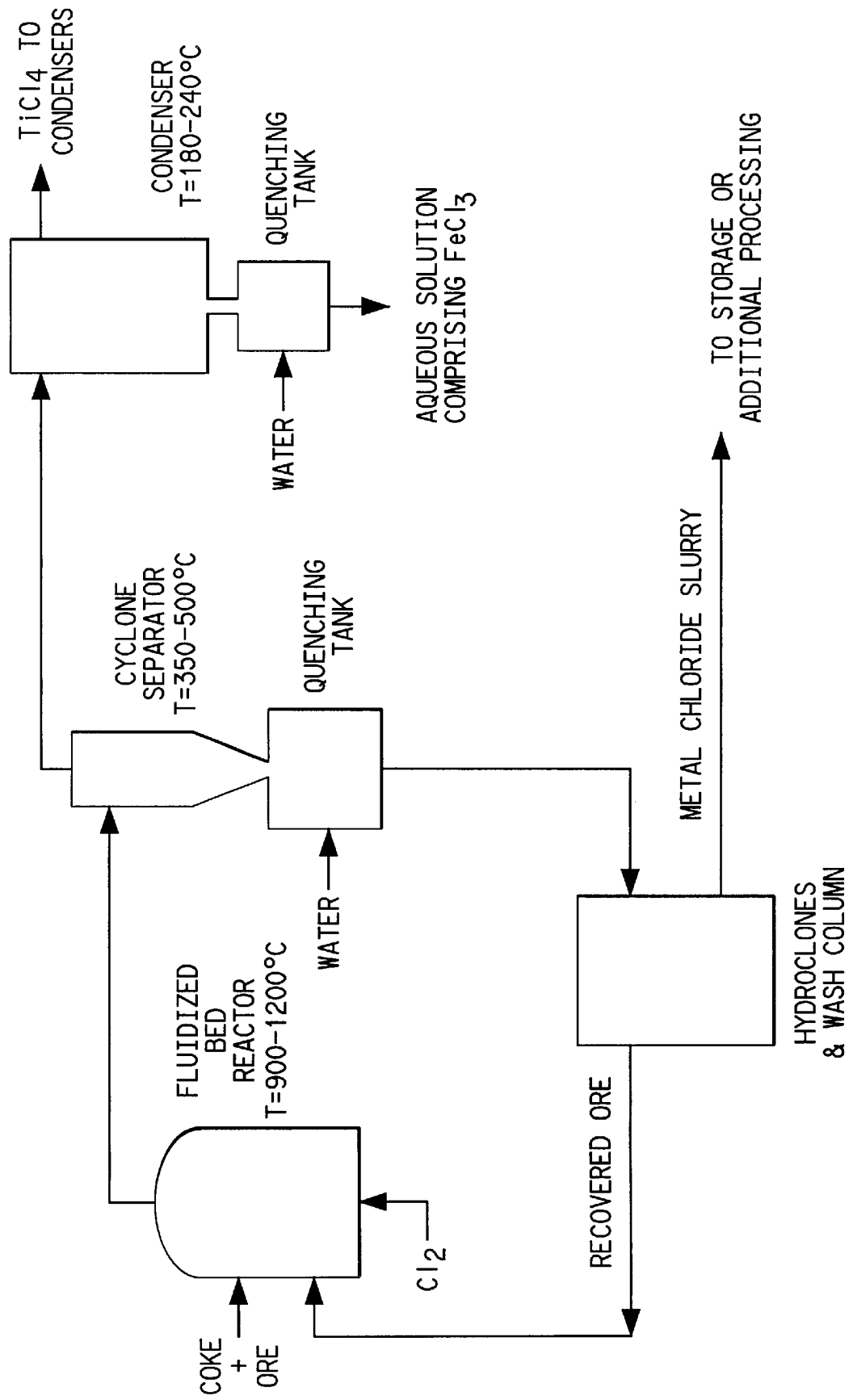
FIG. 1 is a schematic diagram showing a preferred embodiment of the process of this invention.

The present invention provides a process for preparing an aqueous solution comprising ferric chloride.

In the process of the present invention, a titanium- and iron-containing ore material, a carbonaceous material or coke, chlorine, and optionally air or oxygen are fed into a fluidized bed reactor, where they react to provide a metal chloride vapor stream comprising titanium tetrachloride, ferrous chloride, ferric chloride, other metal chlorides, $CO_2$, CO, and solid particulates comprised of unreacted ore, coke and gangue. The titanium-containing material can be any suitable titanium source material such as titanium-containing ores including rutile, ilmenite or anatase ore; beneficiates thereof; titanium-containing by-products or slags; and mixtures thereof and typically contain iron as a major ingredient. Reactor conditions are preferably maintained to convert the iron-containing material to ferric chloride.

The metal chloride vapor stream from the fluidized bed reactor is then cooled to a temperature in the range of 350 to 500° C. and directed to a gas-solid separation device, preferably a cyclone. The metal chloride vapor stream may be cooled by any suitable means, for example, an inert liquid coolant, preferably liquid titanium tetrachloride ($TiCl_4$), may be injected into the stream upstream of the cyclone to control the temperature at the inlet to the cyclone.

Generally, the temperature of the cyclone determines which metal chlorides will condense as solids (or liquids). Metal chlorides having boiling points higher than the cyclone temperature will condense and precipitate, e.g., ferrous chloride ($FeCl_2$); chromium chloride ($CrCl_3$); manganese chloride ($MnCl_2$); magnesium chloride ($MgCl_2$), and lead chloride ($PbCl_2$), and mixtures thereof. Most of the condensed metal chlorides are collected in the cyclone underflow. Most of the unreacted coke, ore and gangue solids and lesser amounts of $FeCl_3$ are also collected in the cyclone underflow.

As discussed above, in conventional processes, the cyclone is operated at an inlet temperature (cooling temperature) higher than 500° C. to prevent liquid $FeCl_3$ from condensing out of the stream and causing plugging problems. Surprisingly, it has now been found that when the metal chloride vapor stream is cooled to a temperature in the range of 350 to 500° C. at the cyclone inlet, the process is less prone to pluggage in piping and equipment downstream of the cyclone, while being more effective in separating and removing a significant portion of $FeCl_2$ and other metal chlorides from the vapor stream. The process of this invention can be run more continuously, with fewer restrictions and less pluggage than observed in conventional processes.

In the present invention, a maximum temperature of 500° C. is significant, because at cyclone inlet temperatures higher than 500° C., the metal chlorides having high boiling points (e.g., $FeCl_2$) are less efficiently removed from the vapor stream in the cyclone. While not wishing to be bound by any theory, it is believed that pluggage in piping and equipment downstream of the cyclone can be caused by either condensation of ferrous chloride and other high-boiling chlorides or condensation of ferric chloride. Operating below 500° C. reduces pluggage by decreasing the amount of condensation of ferrous chloride and other high boiling chlorides in piping and equipment downstream of the cyclone. A minimum temperature of 350° C. is also significant, because at temperatures lower than 350° C., liquid $FeCl_3$ which has a relatively low boiling point may condense in the same piping and equipment, or even in the cyclone, causing pluggage. To optimize removal of $CrCl_3$, $MnCl_2$, $MgCl_2$, $PbCl_2$ and other metal chlorides having high boiling points with minimal loss of $FeCl_3$ and minimal pluggage, the preferred cyclone inlet temperature is 375–475° C. and most preferably 400–450° C.

The solids in the cyclone underflow are conveyed into a quenching tank where they are dissolved and slurried into water. A number of suitable conveying devices can be used in the process of this invention, but it is preferred to use a rotary valve.

Optionally, the cyclone underflow solids can be slurried with water to form an aqueous slurry of dissolved metal chlorides and ore, coke, and gangue solids. The cyclone underflow slurry can be processed through hydrocyclone separators and a wash column to recover some of the ore which is recycled to the fluidized-bed reactor.

The metal chloride vapor stream exiting the cyclone overflow is further cooled to 180–240° C. by addition of a liquid coolant, such as liquid $TiCl_4$. Ferric chloride is precipitated and collected as a solid along with any remaining ferrous chloride, coke, ore, and gangue solids. Any suitable gas-solid separation device can be used. The solids are dissolved and slurried with water to form an aqueous solution of ferric chloride containing trace amounts of coke, ore and gangue solids. Optionally, the aqueous solution can be treated with chlorine, for example, in a plug flow reactor to convert at least some of the ferrous chloride to ferric chloride. After such chlorine treatment, there is preferably less than 0.5% by weight ferrous chloride in solution.

The product of this invention comprising an aqueous solution of ferric chloride can be used in water treatment directly without additional processing. Preferably, this solution has the following composition:

| | |
|---|---|
| FeCl$_3$ | 1–45 wt %, preferably 30–45 wt % |
| FeCl$_2$ | <0.5 wt % |
| HCl | <1 wt % |
| Suspended solids | <0.5 wt. % (coke, ore, gangue) |
| Other metal chlorides* | <4000 ppm |
| Balance is water. | |

*Concentration of other metal chlorides will depend on their concentrations in the titanium- and iron-containing ore feed.

Additional removal of solids can be optionally performed by various solids removal techniques including using a settling pond, filter press, centrifuge, or flotation process. Such additional steps can reduce solids concentrations to less than 0.2 wt. %, typically less than 0.1 wt. %. Further, chlorination of the aqueous solution to lower concentrations of ferrous chloride can also be performed after the additional solids-removal step.

A preferred embodiment of the process of this invention is shown in FIG. 1.

After removal of the ferric chloride and remaining coke and ore solids, the metal chloride vapor stream comprises titanium tetrachloride (TiCl$_4$) and is fed to additional equipment downstream where purified liquid TiCl$_4$ is produced which is used as a feed for TiO$_2$ pigment production.

The present invention provides a process to prepare an aqueous solution comprising ferric chloride which has practical use as a wastewater treatment agent. Ferric chloride is used for reduction of total suspended solids (TSS), biochemical oxygen demand, chemical oxygen demand, phosphorus, color, trace metals and odor as well as sludge conditioning. For example, ferric chloride aids in removal of TSS in wastewater by forming a hydroxide gel which coagulates fine particles into larger agglomerates which can be removed in standard separation equipment.

The invention is further illustrated by the following examples, but these examples should not be construed as limiting the scope of the invention.

EXAMPLE 1

A mixture of 60 wt % ilmenite and 40 wt % titanium-containing slag (mixture composition of 71% TiO$_2$, 24% Fe$_2$O$_3$, 5% other metal oxides) was reacted with petroleum coke and chlorine gas in a fluidized-bed reactor at a temperature of 1000–1200° C. Reactor conditions were maintained so that the Fe$_2$O$_3$ was preferentially converted to FeCl$_3$ with the remainder converted to FeCl$_2$ (Fe$^{3+}$/Fe= 0.70–0.80).

The chlorination reactor outlet stream was cooled to approximately 500° C. by injecting liquid TiCl$_4$ into the flue just upstream of the cyclone inlet to condense ferrous chloride and other metal chlorides having a boiling point higher than 500° C. The condensed metal chloride solids as well as entrained ore and coke particles were collected in the cyclone. The solids underflow temperature measured at the bottom of the cyclone was 325° C. Cyclone collection efficiencies for the various components under these conditions are given in Table 1.

The solids in the cyclone underflow were conveyed by a rotary valve into a quenching tank where the solids were dissolved and slurried into water. The cyclone underflow slurry was pumped to hydrocyclone separators and a wash column to recover some of the ore which was recycled to the chlorination reactor.

The vapor stream exiting the cyclone entered a condenser where liquid TiCl$_4$ was injected to cool the stream to 210° C. to condense FeCl$_3$. TiCl$_4$ remained as a vapor and exited the condenser overhead to additional condensing equipment downstream where the TiCl$_4$ vapor was condensed and collected.

FeCl$_3$ and other precipitated metal chlorides were collected in the condenser. The solids in the condenser underflow were conveyed into a quenching tank where they were dissolved and slurried into water. The composition of the aqueous FeCl$_3$ solution thus produced is given in Table 2.

TABLE 1

Collection Efficiencies (wt. %) of Cyclone Separator for Example 1
Inlet Temperature = 500° C., Solids Underflow Temperature = 325° C.)

| | |
|---|---|
| Cr | 71 |
| Mn | 68 |
| Mg | 70 |
| Pb | 31 |
| FeCl$_3$ | 1.1 |
| FeCl$_2$ | 71 |
| Ore + Gangue | 93 |
| Coke | 95 |

TABLE 2

Composition of Aqueous FeCl$_3$ Solution Produced in Example 1

| | |
|---|---|
| FeCl$_3$ | 36 wt % |
| FeCl$_2$ | 1.9 wt % |
| Free HCl | <1.0 wt % |
| Suspended Solids | 0.17 wt % |
| Cr* | 85 ppm |
| Mn* | 2500 ppm |
| Mg* | 520 ppm |
| Pb* | 100 ppm |

*Concentration of miscellaneous metals will depend on their concentrations in the titanium- and iron-containing ore feed.

EXAMPLE 2

A mixture of 75 wt % ilmenite and 25 wt % titanium-containing slag (mixture composition of 71% TiO$_2$, 25% Fe$_2$O$_3$, 4% other metal oxides) was reacted with petroleum coke and chlorine gas in a fluidized-bed reactor at a temperature of 1000–1200° C. Reactor conditions were maintained so that the Fe$_2$O$_3$ was preferentially converted to FeCl$_3$ with the remainder converted to FeCl$_2$(Fe$^{3+}$/Fe= 0.70–0.80).

The chlorination reactor outlet stream was cooled to approximately 400° C. by injecting liquid TiCl$_4$ into the flue just upstream of the cyclone inlet to condense ferrous chloride and other metal chlorides having a boiling point higher than 400° C. The condensed metal chloride solids as well as entrained ore and coke particles were collected in the cyclone. The solids underflow temperature measured at the bottom of the cyclone was 260° C. Cyclone collection efficiencies for the various components under these conditions are given in Table 3.

The solids in the cyclone underflow were conveyed by a rotary valve into a quenching tank where the solids were dissolved and slurried into water. The cyclone underflow slurry was pumped to hydrocyclone separators and a wash column to recover some of the ore which was recycled to the chlorination reactor.

The vapor stream exiting the cyclone entered a condenser where liquid TiCl$_4$ was injected to cool the stream to 210° C. to condense FeCl$_3$. TiCl$_4$ remained as a vapor and exited the condenser overhead to additional condensing equipment downstream where the TiCl$_4$ vapor was condensed and collected.

FeCl$_3$ and other precipitated metal chlorides were collected in the condenser. The solids in the condenser underflow were conveyed into a quenching tank where they were dissolved and slurried into water. The composition of the aqueous FeCl$_3$ solution thus produced is given in Table 4.

TABLE 3

Collection Efficiencies (wt. %) of Cyclone Separator for Example 2
(Inlet Temperature = 400° C., Solids Underflow Temperature = 260° C.)

| | |
|---|---|
| Cr | 95 |
| Mn | 95 |
| Mg | 95 |
| Pb | 69 |
| FeCl$_3$ | 4 |
| FeCl$_2$ | 86 |
| Ore + Gangue | 99 |
| Coke | 93 |

TABLE 4

Composition of Aqueous FeCl$_3$ Solution Produced in Example 2

| | |
|---|---|
| FeCl$_3$ | 40 wt % |
| FeCl$_2$ | 2.2 wt % |
| Free HCl | <1.0 wt % |
| Suspended Solids | 0.17 wt % |
| Cr* | 30 ppm |
| Mn* | 570 ppm |
| Mg* | 150 ppm |
| Pb* | 60 ppm |

*Concentration of miscellaneous metals will depend on their concentrations in the titanium- and iron-containing ore feed.

We claim:

1. A process for preparing an aqueous solution comprising ferric chloride, comprising the steps of:
   (a) reacting an ore material comprising titanium and iron with chlorine and coke to form a metal chloride vapor stream comprising titanium tetrachloride, ferrous chloride, ferric chloride and unreacted coke and ore solids;
   (b) cooling the metal chloride vapor stream to a temperature in the range of 350° to 500° C. to condense at least some of the ferrous chloride;
   (c) feeding the metal chloride vapor stream into a cyclone at an inlet temperature in the range of 350° to 500° C. separating the condensed ferrous chloride and the unreacted coke and ore solids from the metal chloride vapor stream, and discharging the solids from the cyclone at an underflow temperature in the range of 260° to 325° C.;
   (d) cooling the metal chloride vapor stream resulting from step (c) to a temperature in the range of 180° to 240° C. to form a precipitate comprising ferric chloride; and
   (e) adding the precipitate to water to form an aqueous solution comprising ferric chloride.

2. The process of claim 1, wherein in addition to ferrous chloride, other metal chlorides, having a boiling point higher than the cooling temperature are condensed in step (b), and separated and removed from the metal chloride vapor stream in step (c).

3. The process of claim 2, wherein the other metal chlorides are selected from the group consisting of chromium chloride, manganese chloride, magnesium chloride, lead chloride, and mixtures thereof.

4. The process of claim 2, wherein the ferrous chloride and other metal chlorides are separated and removed from the metal chloride vapor stream in step (b) and conveyed to a quenching tank containing water.

5. The process of claim 1, wherein titanium tetrachloride is added to the metal chloride vapor stream for cooling in steps (b) and (d).

6. The process of claim 1, wherein the precipitate comprising the ferric chloride formed in step (d) is conveyed to a quenching tank containing water.

7. The process of claim 1, wherein the aqueous solution formed in step (e) comprises ferrous chloride in addition to ferric chloride.

8. The process of claim 7, wherein chlorine is injected into the aqueous solution to convert at least some of the ferrous chloride to ferric chloride.

9. The process of claim 1, wherein the aqueous solution comprises 1 to 45% by weight of ferric chloride based on total weight of the solution.

10. The process of claim 9, wherein the aqueous solution comprises 30 to 45% by weight of ferric chloride based on total weight of the solution.

11. The process of claim 9, wherein the aqueous solution comprises less than 0.5% by weight of ferrous chloride, less than 1% by weight of hydrochloric acid, and less than 0.5% by weight of solids based on total weight of the solution.

* * * * *